(12) United States Patent
Jerzak et al.

(10) Patent No.: US 9,002,823 B2
(45) Date of Patent: *Apr. 7, 2015

(54) ELASTIC COMPLEX EVENT PROCESSING

(75) Inventors: Zbigniew Jerzak, Walldorf (DE);
Thomas Heinze, Walldorf (DE);
Yuanzhen Ji, Walldorf (DE)

(73) Assignee: SAP SE, Walldorf (DE)

( * ) Notice: Subject to any disclaimer, the term of this patent is extended or adjusted under 35 U.S.C. 154(b) by 267 days.

This patent is subject to a terminal disclaimer.

(21) Appl. No.: 13/536,698

(22) Filed: Jun. 28, 2012

(65) Prior Publication Data

US 2014/0006384 A1    Jan. 2, 2014

(51) Int. Cl.
*G06F 7/00* (2006.01)
*G06F 17/00* (2006.01)
*G06F 17/30* (2006.01)

(52) U.S. Cl.
CPC ................................. *G06F 17/30103* (2013.01)

(58) Field of Classification Search
CPC ................... G06F 17/30867; G06F 17/30522; G06F 17/3053; G06F 17/30554; G06F 17/30643; G06F 17/30103
USPC ........ 707/779; 709/225; 718/102; 705/14.43
See application file for complete search history.

(56) References Cited

U.S. PATENT DOCUMENTS

| | | | | |
|---|---|---|---|---|
| 7,526,547 | B2 * | 4/2009 | Rodrigo ........................ | 709/225 |
| 8,713,049 | B2 * | 4/2014 | Jain et al. ...................... | 707/779 |
| 2006/0111880 | A1 * | 5/2006 | Brown et al. .................... | 703/1 |
| 2011/0015989 | A1 * | 1/2011 | Tidwell et al. ............. | 705/14.43 |
| 2011/0041132 | A1 * | 2/2011 | Andrade et al. .............. | 718/102 |
| 2013/0263120 | A1 * | 10/2013 | Patil et al. ......................... | 718/1 |

OTHER PUBLICATIONS

Alexander Alexandrov, Dominic Battre, Stephan Ewen, Max Heimel, Fabian Hueske, Odej Kao, Volker Markl, Erik Nijkamp, and Daniel Warneke, "Massively parallel data analysis with pacts on nephele." PVLDB, 3(2):1625-1628, 2010.

A. Arasu, S. Babu, and J. Widom, "The cql continuous query language: semantic foundations and query execution". PVLDB, 15(2)121-142, 2006.

Michael Armbrust, Armando Fox, Rean Griffith, Anthony D. Joseph, Randy Katz, Andy Konwinski, Gunho Lee, David Patterson, Ariel Rabkin, Ion Stoica, and Matei Zaharia, "A view of cloud computing." Communications of the ACM, 53(4):50-58, Apr. 2010.

(Continued)

*Primary Examiner* — Susan Chen
(74) *Attorney, Agent, or Firm* — Fountainhead Law Group P.C.

(57) ABSTRACT

Systems and methods according to embodiments provide elasticity for complex event processing (CEP) systems. Embodiments may comprise at least the following three components: (1) incremental query optimization, (2) operator placement, and (3) cost explanation. Incremental query optimization allows avoiding simultaneous computation of identical results by performing operator-level query reuse and subsumption. Using automatic operator placement, a centralized CEP engine can be transformed into a distributed one by dynamically distributing and adjusting the execution according to unpredictable changes in data and query load. Cost explanation functionality can provide end users with near real-time insight into the monetary cost of the whole system, down to operator level granularity. Combination of these components allows a CEP system to be scaled up and down.

18 Claims, 9 Drawing Sheets

(56) References Cited

OTHER PUBLICATIONS

E.G. Coffman Jr, M.R. Garey, and D.S. Johnson, "Approximation algorithms for bin packing: A survey. In Approximation algorithms for NP-hard problems," pp. 46-93. PWS Publishing Co., 1996.

Bugra Gedik, Henrique Andrade, Kun-Lung Wu, Philip S. Yu, and Myungcheol Doo, "Spade: The system's declarative stream processing engine." In Jason Tsong-Li Wang, editor, Proceedings of the 2008 ACM SIGMOD international conference on Management of data, pp. 1123-1134, Vancouver, BC, Canada, Jun. 2008. ACM.

Vincenzo Gulisano, Ricardo Jimenez-Peris, Marta Patino-Martinez, and Patrick Valduriez, "Streamcloud: A large scale data streaming system." In Proceedings of the 2010 IEEE 30th International Conference on Distributed Computing Systems, ICDCS '10, pp. 126-137, Washington, DC, USA, 2010. IEEE Computer Society.

C. Jin, and J. Carbonell, "Predicate indexing for incremental multi-query optimization". Foundations of Intelligent Systems, pp. 339-350, 2008.

S. Schneider, H. Andrade, B. Gedik, A. Biem, and K. Wu. "Elastic scaling of data parallel operators in stream processing". In Parallel & Distributed Processing, 2009. IPDPS 2009. IEEE International Symposium on, pp. 1-12. IEEE, 2009.

Lisa K. Stapleton "Taming big data." IBM Data Management Magazine, 16:12-18, 2011.

E. Wu, Y. Diao, and S. Rizvi, "High-performance complex event processing over streams". In Proceedings of the 2006 ACM SIGMOD Conference, pp. 407-418, 2006.

Thomas Heinze. "Elastic complex event processing." In Proceedings of the 8th Middleware Doctoral Symposium, MDS '11, pp. 4:1-4:6, New York, NY, USA, 2011. ACM.

Zbigniew Jerzak, Anja Klein, and Gregor Hackenbroich, Reasoning in Event-Based Distributed Systems, chapter Ginseng Data Processing Framework, pp. 125-150. Springer Berlin, Heidelberg, 2011.

Internet article "Sybase Even Stream Processor 5.0> CCL Programmers Guide >Introduction to Sybase Event Stream Proccessor.", created Apr. 23, 2012, Sybase Technical Publication, printed Jun. 18, 2012.

* cited by examiner

| | | | |
|---|---|---|---|
| COMPANY A<br>Industrial | 65.58 | 65.55 | 65.69 |
| COMPANY B<br>Automobile | 89.99 | 89.97 | 90.07 |
| COMPANY C<br>Chemicals | 43.90 | 43.84 | 43.93 |
| COMPANY D<br>Pharma & Helathcare | 59.96 | 59.95 | 60.00 |
| COMPANY E<br>Banks | 24.16 | 24.16 | 24.23 |
| COMPANY F<br>Consumer | 38.30 | 38.24 | 38.36 |
| COMPANY G<br>Utilities | 15.83 | 15.82 | 15.84 |
| COMPANY H<br>Financial Services | 0.37 | 0.37 | 0.37 |
| COMPANY I<br>Insurance | 65.83 | 65.76 | 65.91 |
| COMPANY J<br>Transportation & Logistics | 9.23 | 9.22 | 9.24 ≫ |
| COMPANY K<br>Technology | 5.16 | 5.15 | 5.17 |
| COMPANY L<br>Telecommunication | 8.66 | 8.65 | 8.66 |
| COMPANY M<br>Retail | 30.69 | 30.69 | 30.72 |
| COMPANY N<br>Software | 37.07 | 37.04 | 37.09 |

FIG. 4C

ELASTIC COMPLEX EVENT PROCESSING

BACKGROUND

Embodiments of the present invention relate to complex event processing, and in particular, to systems and methods allowing elastic complex event processing.

Unless otherwise indicated herein, the approaches described in this section are not prior art to the claims in this application and are not admitted to be prior art by inclusion in this section.

Complex Event Processing (CEP) systems may be used to execute queries over moving data coming from unbounded sources. Examples of such unbounded sources include but are not limited to sensors used for equipment monitoring, or stock market data.

A challenge for such systems is to support elasticity. Elasticity is the ability to automatically scale up and down in a distributed environment to be able to accommodate varying load.

When a CEP system scales up, it uses an increasing number of hosts (virtual or physical computers) in order to be able to process the increasing amount of data. Conversely when the amount of data to be processed decreases, an elastic CEP system scales down, freeing up underutilized hosts to increase the overall utilization and reduce costs.

Scaling up allows the CEP system to process the large amount of streaming data. Without scaling up a CEP system would not be able to process all data, resulting in a direct financial loss due to, e.g., violation of a Service Level Agreement (SLA). Scaling down is vital for lowering the True Cost to Own (TCO) of the CEP system. A CEP system able to both scale down and scale up, is known as elastic.

Accordingly, there is a need in the art for systems and methods providing elastic complex event processing.

SUMMARY

Systems and methods according to embodiments provide elasticity for complex event processing (CEP) systems. Embodiments may comprise at least the following three components: (1) incremental query optimization, (2) operator placement, and (3) cost explanation. Incremental query optimization allows avoiding simultaneous computation of identical results by performing operator-level query reuse and subsumption. Using automatic operator placement, a centralized CEP engine can be transformed into a distributed one by dynamically distributing and adjusting the execution according to unpredictable changes in data and query load. Cost explanation functionality can provide end users with near real-time insight into the monetary cost of the whole system, down to operator level granularity. Combination of these components allows a CEP system to be scaled up and down.

An embodiment of a computer-implemented method comprises causing a cost explanation component maintaining a cost model, to index a query submitted by a user. The cost explanation component is caused to forward the query to a query optimization component maintaining a query graph. The query optimization component is caused to match the query against the query graph to detect re-use or subsumption of operators, and produce a modified query graph. The modified query graph is forwarded to an operator placement component. The operator placement component is caused to deploy new operators based upon the modified query graph. The cost explanation component is caused to receive information regarding system utilization and operator performance statistics, from an associated distributed Complex Event Processing (CEP) system comprising a host upon which the new operator has been deployed. Based upon the information and the cost model, the cost explanation component is caused to provide feedback to the user regarding a monetary cost of the distributed CEP system.

An embodiment of a non-transitory computer readable storage medium embodies a computer program for performing a method, said method comprising causing a cost explanation component maintaining a cost model, to index a query submitted by a user. The cost explanation component is caused to forward the query to a query optimization component maintaining a query graph. The query optimization component is caused to match the query against the query graph to detect re-use or subsumption of operators, and produce a modified query graph. The modified query graph is forwarded to an operator placement component. The operator placement component is caused to deploy new operators based upon the modified query graph. The cost explanation component is caused to receive information regarding system utilization and operator performance statistics, from an associated distributed Complex Event Processing (CEP) system comprising a host upon which the new operator has been deployed. Based upon the information and the cost model, causing the cost explanation component to provide feedback to the user regarding a monetary cost of the distributed CEP system.

An embodiment of a computer system comprises one or more processors and a software program, executable on said computer system. The software program is configured to cause a cost explanation component maintaining a cost model, to index a query submitted by a user. The software program is further configured to cause the cost explanation component to forward the query to a query optimization component maintaining a query graph. The software program is further configured to cause the query optimization component to match the query against the query graph to detect re-use or subsumption of operators, and produce a modified query graph. The software program is further configured to forward the modified query graph to an operator placement component. The software program is configured to cause the operator placement component to deploy new operators based upon the modified query graph. The software program is configured to cause the cost explanation component to receive information regarding system utilization and operator performance statistics, from an associated distributed Complex Event Processing (CEP) system comprising a host upon which the new operator has been deployed. Based upon the information and the cost model, the software program is configured to cause the cost explanation component to provide feedback to the user regarding a monetary cost of the distributed CEP system.

Certain embodiments may be further configured to cause the operator placement component to also receive the information, cause the operator placement component to use the information to perform run-time adaptation.

According to some embodiments, for operator placement the operator placement component performs a two phase approach comprising estimation, and run-time monitoring and adaptation.

In various embodiments the host comprises an existing host of the distributed CEP system.

In particular embodiments the host comprises a new host allocated from a resource pool.

In some embodiments the operator placement component deploys the new operators according to a bin packing technique.

The following detailed description and accompanying drawings provide a better understanding of the nature and advantages of particular embodiments.

BRIEF DESCRIPTION OF THE DRAWINGS

FIGS. 4A-C show portions of a screen shot of a user interface showing processing of stock market data according to an embodiment.

DETAILED DESCRIPTION

Described herein are techniques for elastic complex event processing. The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Complex Event Processing (CEP) systems are designed to process large volumes of data at high velocity. In contrast to batch oriented systems, CEP systems process streaming data originating from unbounded sources. Examples of such sources include: equipment monitoring systems, smart metering devices, or stock markets.

Data processing within CEP systems may be driven by standing queries. The combination of continuous, high velocity data streams and standing queries may impose new requirements on CEP systems, especially when compared with classical database or batch oriented systems operating on static data.

A challenge for CEP systems is to support the elasticity by design. Elasticity can be defined on at least two levels: (1) an infrastructure level, and (2) a software level.

Elasticity at the infrastructure level is the ability of the infrastructure to provide an illusion of an infinite resource pool to the software system deployed on top of it. On the software level, the elasticity is the ability of the software system to dynamically and automatically scale up and down to accommodate both increasing and decreasing load, respectively.

Elasticity is the underlying principle behind the cloud computing. It allows both infrastructure and software to scale up to meet peak demand, and to scale down so as to accommodate steady-state workload. This avoids costly overprovisioning and, consequently, results in a better overall system utilization.

Figure 1:
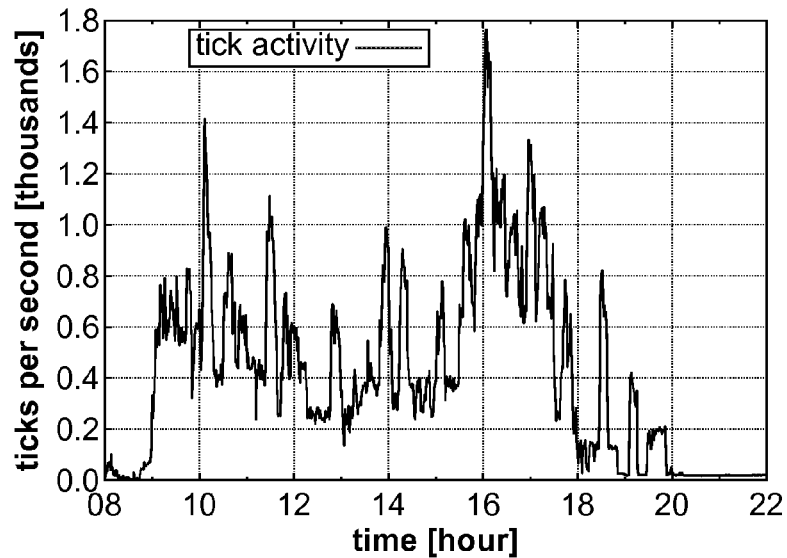
FIG. 1 shows a fourteen hour histogram of a tick data stream volume from a stock market.

FIG. 1 shows a fourteen hour histogram of tick data stream from a stock market. It reflects a typical workload experienced by CEP systems processing financial data, with peak load reaching almost 2000 events per second, and idle load equal almost to zero.

Providing elasticity at the infrastructure level has been studied and used in productive environments. An example is the Amazon Elastic Computing Cloud (EC2).

Elasticity at the software level, however, remains an issue. Specific challenges in the context of CEP systems include but are not limited to:

(1) the ability to distribute load and queries across a varying number of hosts;

(2) the ability to continuously optimize the processing of data with respect to throughput and latency without assumptions about statistical properties of data and queries, and (3) the ability to get real-time insight into the running system and its costs.

Embodiments of systems and methods as described herein, may address one or more of the above challenges. Complex Event Processing systems and methods according to embodiments, may utilize an architecture comprising at least three components: (1) query optimization, (2) operator placement, and (3) explanation for cost. One embodiment of an architecture is described below in conjunction with FIG. 2.

Thanks to its design, embodiments of CEP systems can be deployed on top of a centralized (i.e. not distributed) CEP engine, and empower it with the ability to elastically scale across a distributed cloud environment.

One aspect of certain embodiments of CEP systems is query optimization. Query optimization allows avoidance of simultaneous computation of identical results, by performing operator-level query reuse and subsumption.

Using an automatic operator placement, embodiments can transform a centralized CEP engine into a distributed one. This allows dynamically distributing and adjusting the execution according to unpredictable changes in data and query load.

Finally, the cost explanation functionality allows end users to be provided with near real-time insight into the monetary cost of the whole system. This insight can penetrate down to the operator level granularity.

Embodiments may be implemented on top of a centralized commercial CEP engine. As described in connection with the Example below, in certain embodiments system components may be used in order to process real stock market data in an elastic way.

Embodiments may relate to a centralized system which drives and monitors the execution of the underlying CEP engine of choice. A centralized architecture may be well aligned with the distributed cloud environment, and comprise a set of very well connected hosts. For the sake of fault tolerance, a system state can be persisted, for example in the Zookeeper™ available from APACHE™.

Figure 2:
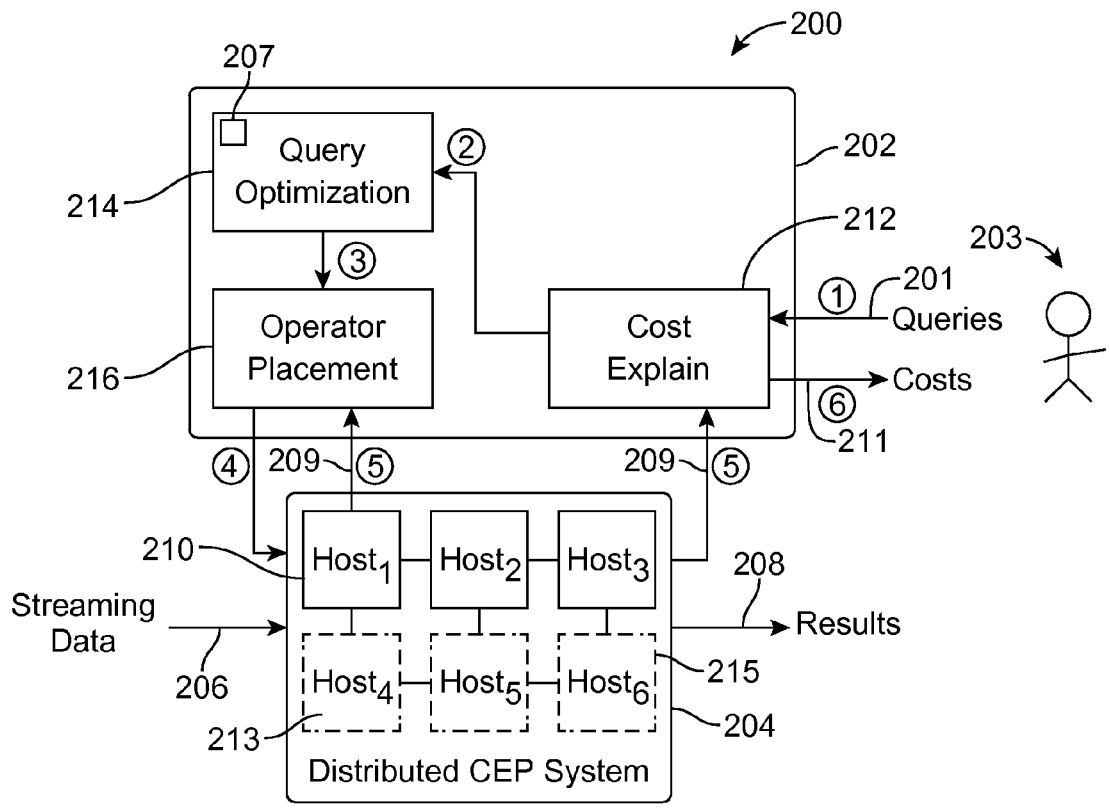
FIG. 2 is a simplified diagram showing a system architecture according to an embodiment.
Figure 2A:
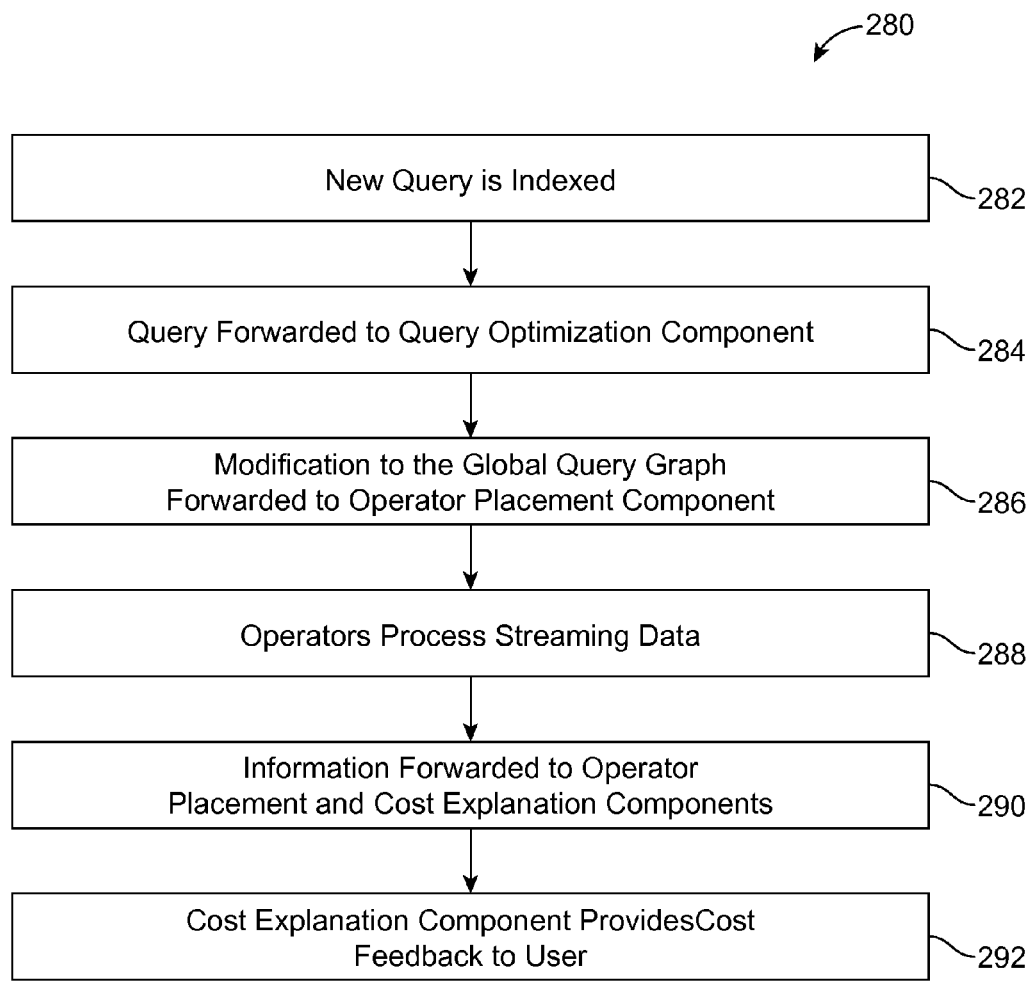

Embodiments may act as a single point of entry for queries targeting a CEP system under its control. FIG. 2 shows a simplified view of an architecture of a system 200 according to an embodiment, which is configured to interface with a corresponding distributed CEP system 204. FIG. 2A is a simplified flow diagram of a process 280 according to an embodiment.

In a first step 282, a new query 201 submitted by a user 203 is indexed in the cost explanation ("cost explain") component 212. In second step 284, the query is subsequently forwarded to query optimization component 214.

The query optimization component maintains a global query graph 207 for the underlying CEP system. New queries are incrementally matched against the global query graph, in order to detect potential re-use and subsumption of operators.

In a third step 286, the resulting modification (new operators) to the global query graph, is forwarded to the operator placement component 216. The operator placement component deploys new operators on existing hosts 210 (e.g. Hosts$_{1-3}$). If existing hosts do not have enough capacity to accommodate new operators, the operator placement component allocates new hosts 213 (e.g. Hosts$_{4-6}$) from a resource pool 215.

In a fourth step 288, newly deployed operators on the distributed CEP system 204 are instructed to process streaming data 206. This processing by the distributed CEP system in turn produces corresponding results 208.

In a fifth step 290, information 209 regarding system utilization and operators performance statistics, are forwarded to the operator placement and the cost explanation components. The operator placement component uses this information to perform run-time adaptation.

In a sixth step 292, the cost explanation component uses the information to provide near real-time feedback 211 on the monetary cost of the system, to the user.

Query optimization is now discussed. In certain embodiments, Continuous Computation Language (CCL) may be used as its input query language. Internally, however, embodiments may use their own query representation. This allows the system to consume other query formats, providing that a corresponding adapter exists.

Certain embodiments may use the operator level programming model, which creates a hierarchy comprising operators, which form queries, which form a global query graph. In one embodiment of a programming model, operators are the smallest units of computation forming a superset of classical relational algebra operators.

One goal of the query optimization component may be to minimize the total number of operators processing data in the CEP controlled by the system. The impact of query optimization on the CEP systems can be high, especially considering that CEP systems are designed to process data using standing queries with no lifetime limit.

Embodiments may rely on incremental multi-query optimization. This approach allows addition of new queries to the global query graph, without the need to change the semantics of the state of the already running operators within the global query graph.

Query optimization according to various embodiments, may operate using indices on data streams. It may support detection of equivalence, as well as subsumption relation, between newly added operators and those already in the global query graph. The equivalence detection allows for a direct reuse of results from an existing global query graph, providing a new operator produces the same set of results.

Subsumption allows reuse of results from an existing operator if its results form a superset of results generated by the new operator. Using subsumption scheme instead of (e.g. deploying a new join operator), allows reuse of results from an existing join operator and addition of a stateless (computationally less demanding) filter operator in order to remove unnecessary items.

The operator placement component may be responsible for performing a number of functions. One function is the management of the pool of hosts in the cloud infrastructure. Another function is the deployment of new operators onto the hosts. Still another function is runtime monitoring and adaptation of the deployment.

When the operator placement component receives a set of operators to be deployed on the underlying distributed CEP system, it first performs a conservative estimation of the workload new operators would impose on the system. Subsequently, using bin packing for example, the operator placement component tries to deploy operators on the already used set of hosts.

If the available capacity is lower than the calculated workload, new hosts are claimed from the idle host pool. Once deployed, operators and hosts are monitored to detect potential overload and underutilization. Whenever a host is overloaded, part of its operators are moved to other hosts. If a host is underutilized, the operators placement component will try to re-allocate its operators and free the host to maintain high overall system utilization.

Embodiments may employ bin packing, for example, to assign operators to hosts. This is because it is independent of the number of buckets (hosts) and it scales with the increasing number of hosts and operators. Specific experiments have shown the ability to perform placement for 100,000 queries in as little as 150 milliseconds using commodity hardware, e.g. a dual core CPU with 4 GB RAM.

Embodiments may employ a two phase approach for operator placement (estimation, and run-time monitoring & adaptation), that emphasizes the run-time adaptation part. Such approaches may be favorably aligned with the unpredictable and unbounded nature of streaming data sources. Other approaches relying on statistical sampling and static data in order to predict the workload of different operators, may not be applicable.

Figure 3:
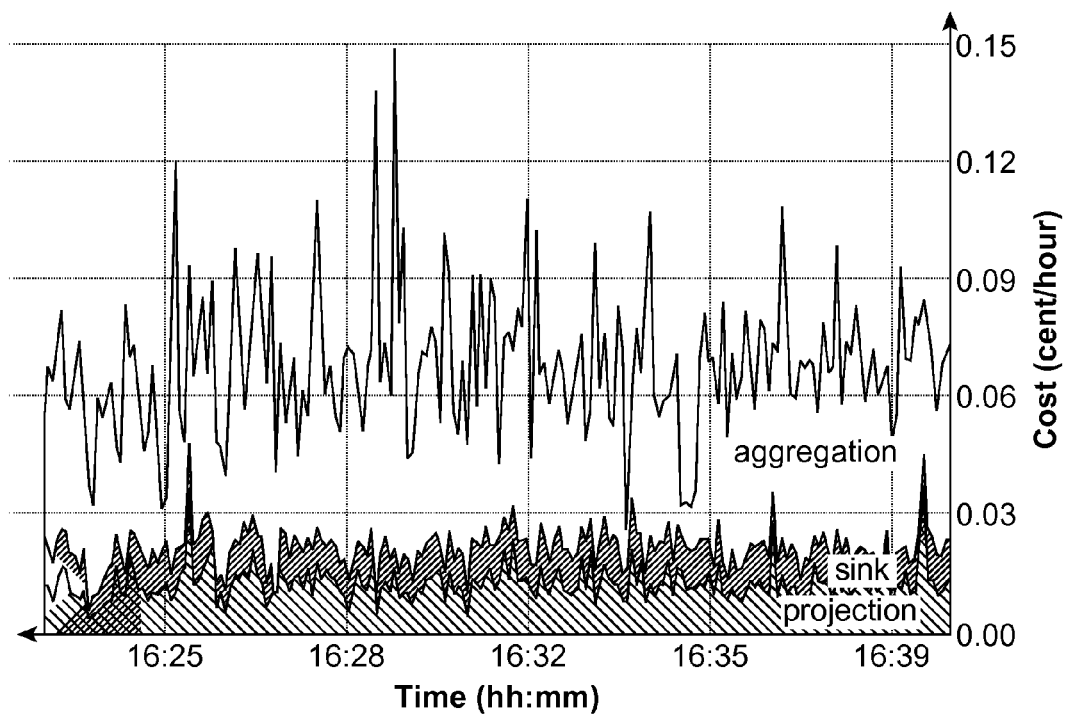
FIG. 3 is a screen shot of a user interface showing a near real-time cost explanation.

The cost explanation component empowers the end user with near real-time insight into the monetary cost of queries executed in the CEP engine running on top of the cloud infrastructure. FIG. 3 shows an example of a graph of cost versus time.

Submitted queries are broken down into separate operators, with live monetary cost being recorded for each. The live cost monitoring allows embodiments to prevent a so-called "bill shock". In particular automated scaling in combination with unpredictable streaming data sources (e.g. as shown in FIG. 1), can result in a CEP system trying to handle a sudden flash crowd. Handling a sudden flash crowd implies a much higher resource consumption when compared to a steady state workload period. This, in turn, can translate into a much higher than expected bill for a user ("bill shock").

By contrast, near real-time cost monitoring according to various embodiments allows such situations to be detected and avoided.

In order to accommodate different cost models used by different cloud infrastructure providers, embodiments may use an internal cost model. The internal cost model can be modified by the user so as to reflect other available pricing schemes. Accordingly, embodiments may be able to monitor systems running on platforms such as Amazon EC2™, Windows Azure™, Rackspace Cloud™, or other (also) private clouds, with only adjustment of the cost model to reflect the actual billing scheme.

By being aimed at distributed, shared cloud systems, internal cost models according various embodiments may be tailored to reflect the sharing of hosts by different operators being part of queries owned by different users. To that end, according to various embodiments a cost model can proportionally distribute the total cost for CPU and RAM across the running queries (and users) based on the utilization of the aforementioned resources.

Example

Here, it is demonstrated how an embodiment of a system may automatically scale with the varying workload, and how it may provide users with insight into their real-time monetary costs. In particular, this example demonstrates an embodiment using real stock market data.

Specifically, an embodiment is deployed on top of a commercial CEP engine processing stock market data. A data set comprises a single day's worth of ticks as shown in FIG. 1—a total of about 8 million events. A single tick represents a minimum price movement (in our case 0.01 EUR) at the given stock exchange for a given instrument.

The data is replayed using a generator which preserves the original data throughput and inter-event arrival times. The generator can also replay data using a speedup factor (decreasing the inter-event arrival time) to further stress the system.

The queries processed by the system stem from both the UI and a query generator. The query generator is used in order to simulate an elastic query load pattern.

Figure 4A:
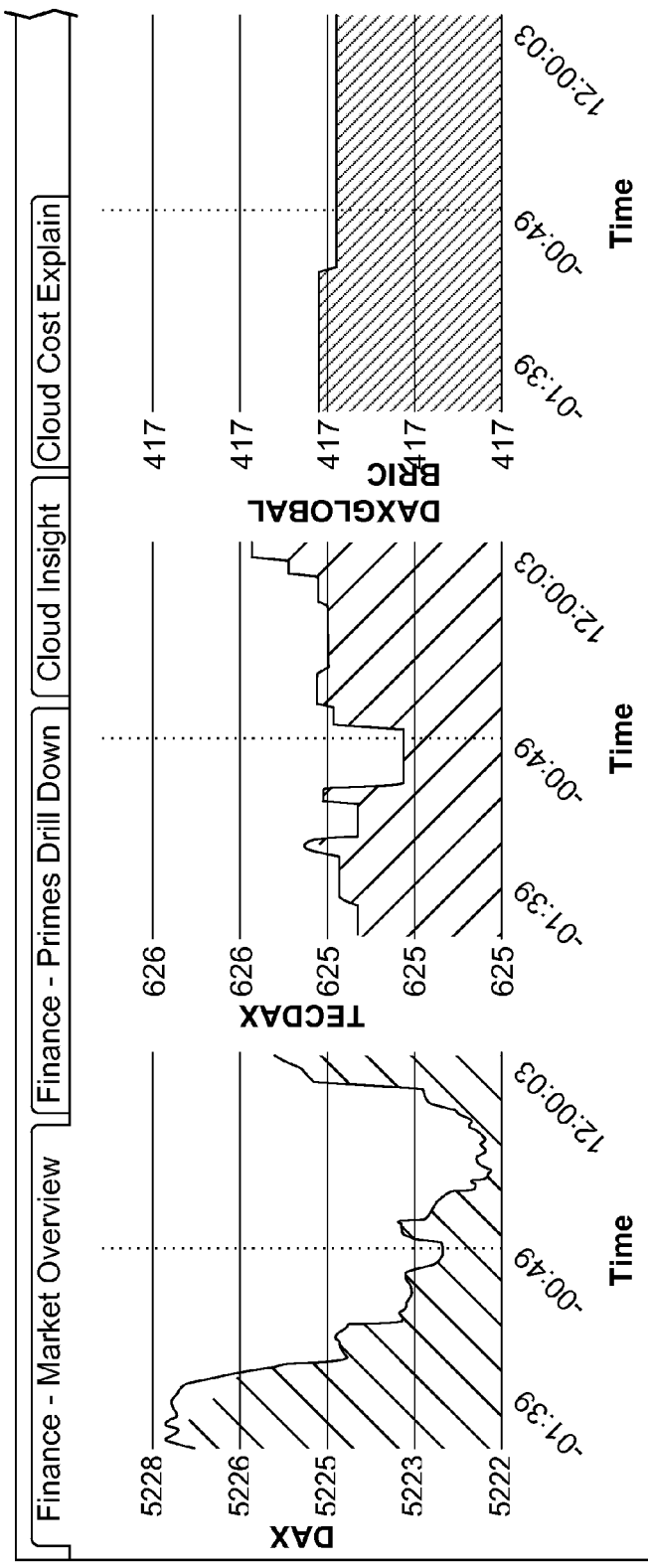
Figure 4B:
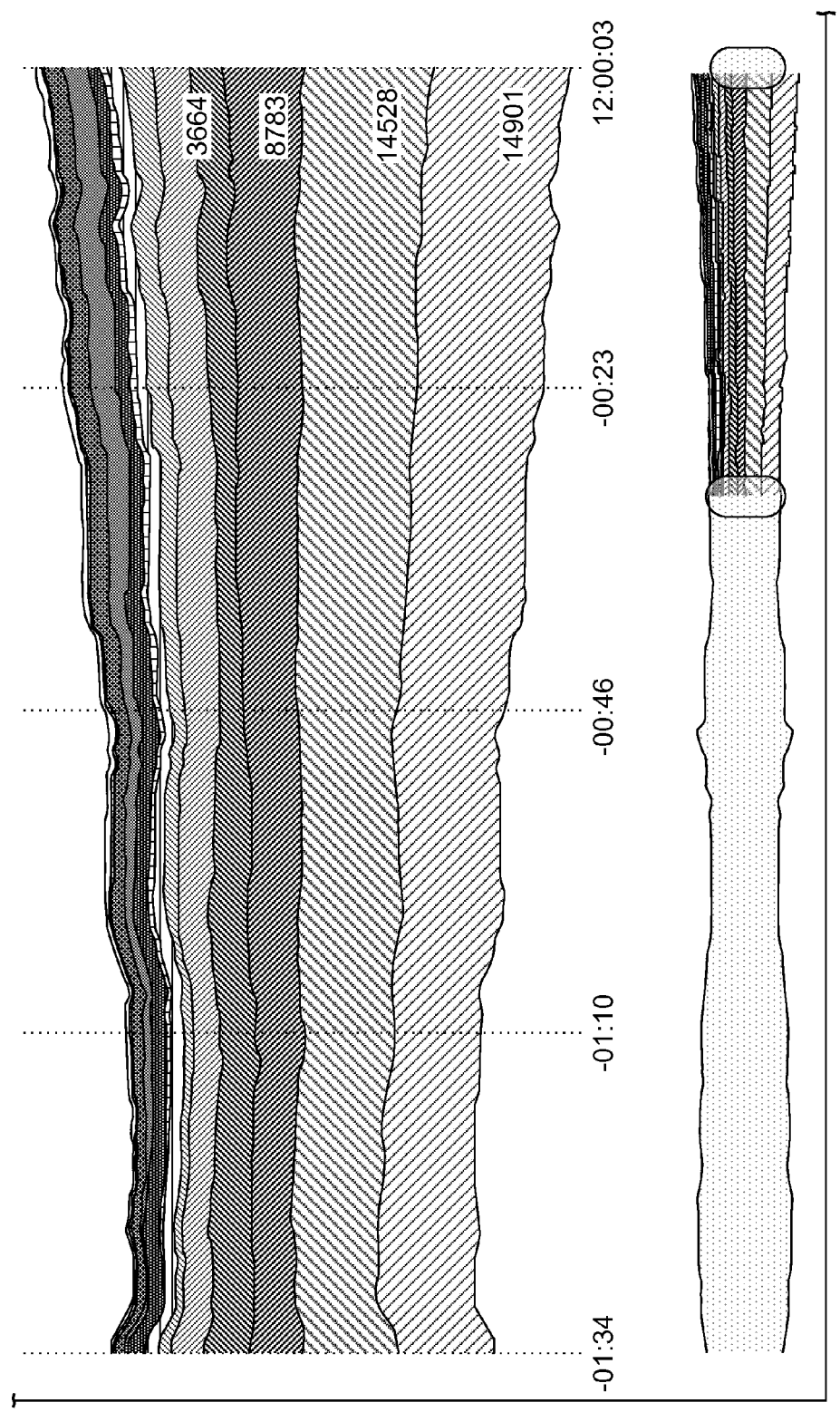

As shown in the screen-shot portions of FIGS. 4A-C, the UI according to an embodiment may comprise a HTML5-based application which can run on a modern browser supporting push functionality via WebSocket. Utilizing the HTML5 UI, users can issue their own queries and observe the real-time monetary costs.

Figure 5:
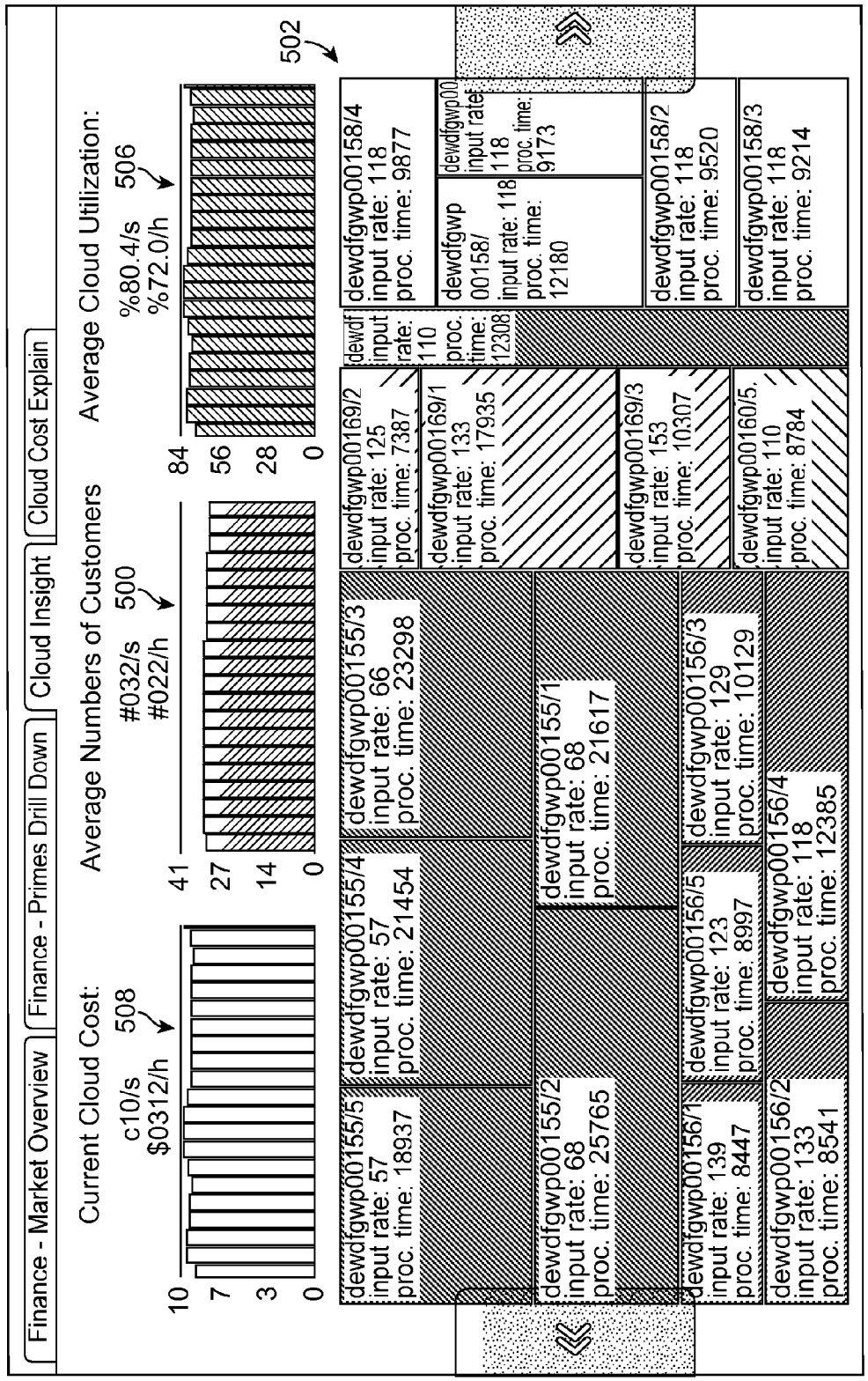
FIG. 5 is a screen shot of user interface showing near real-time insight into elasticity of a system according to an embodiment.

In a first scenario, a visualization of the elastic scaling and load balancing performed by the system is presented. This is shown FIG. 5.

In particular, the top middle graph 500 shows a current number of queries running in the system. Queries, issued by the query generator, follow a sine wave pattern, emulating an elastic workload. The dynamic treemap 502, at the bottom of the screen, illustrates the current deployment of queries on the hosts of the system.

A single color represents a single host. Multiple rectangles sharing the same color, represent different queries running on the same host, with the size of the rectangle being proportional to the processing time of the given query.

The demonstration shows how (in real-time) queries are dynamically allocated and deallocated from hosts, following the pattern of queries issued by the query generator.

Simultaneously, on the top right graph 506 a user can observe the effect of the elastic scaling on the overall system utilization. During the peak load, the system uses six (6) nodes to handle queries. During the minimum load period, only two (2) hosts are used. Thanks to the elastic scaling, the overall utilization is kept at a high level.

Moreover, the overall cost for the system (shown in the top left graph 508), decreases as soon as the number of queries decreases as well.

A second scenario illustrated in this example relates to writing, estimating, and monitoring a Monetary Query Cost. This scenario shows the UI allowing users to issue queries using CQL language.

After issuing a query, the system may perform cost estimation for the newly added query.

After deployment, users can switch to the query explain view, to monitor the query execution cost in real-time. Using this view, users can also compare the estimated costs with the real costs.

Using the cost explanation view, users can also take advantage of the explain functionality, which shows the query graph on the operator level. Having selected a single operator, the UI shows the costs for it including CPU, RAM, and network usage statistics, as well as current event rate. This allows for a detailed analysis of the costs of a given query. FIG. 3 shows an example of the cost view, for a query comprising three operators: projection, aggregation and a sink.

Figure 6:
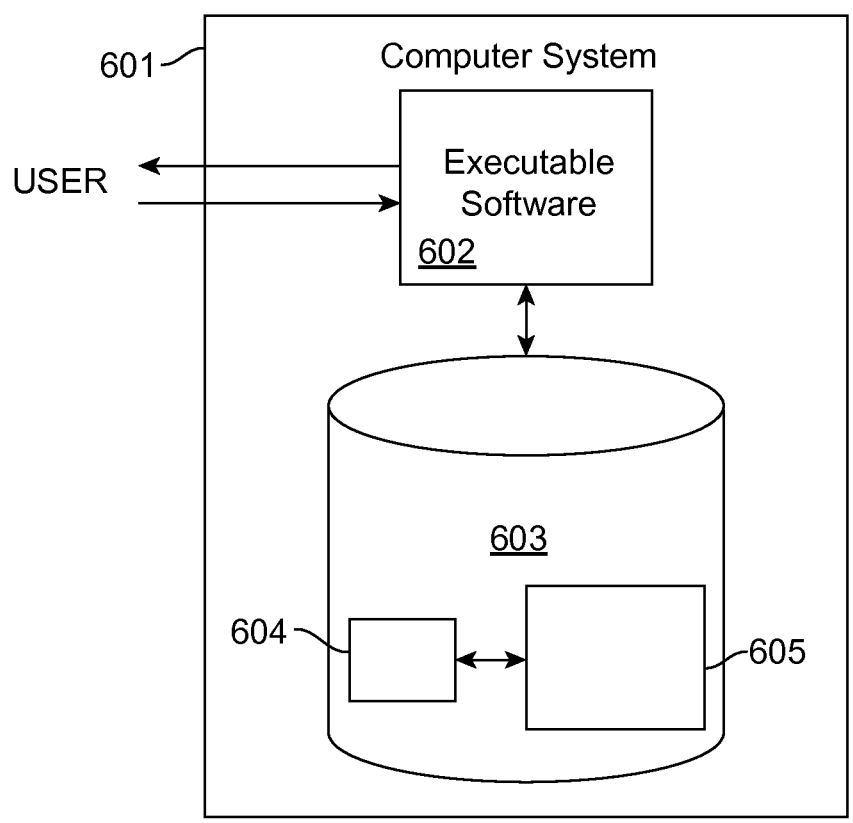
FIG. 6 illustrates hardware of a special purpose computing machine configured to perform elastic complex event processing according to an embodiment.

FIG. 6 illustrates hardware of a special purpose computing machine configured to perform complex event processing according to an embodiment. In particular, computer system 600 comprises a processor 602 that is in electronic communication with a non-transitory computer-readable storage medium 603. This computer-readable storage medium has stored thereon code 605 corresponding to the cost explanation component. Code 604 corresponds to one or more other components of the system, including but not limited to the operator placement component and/or the query optimization component. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 7:
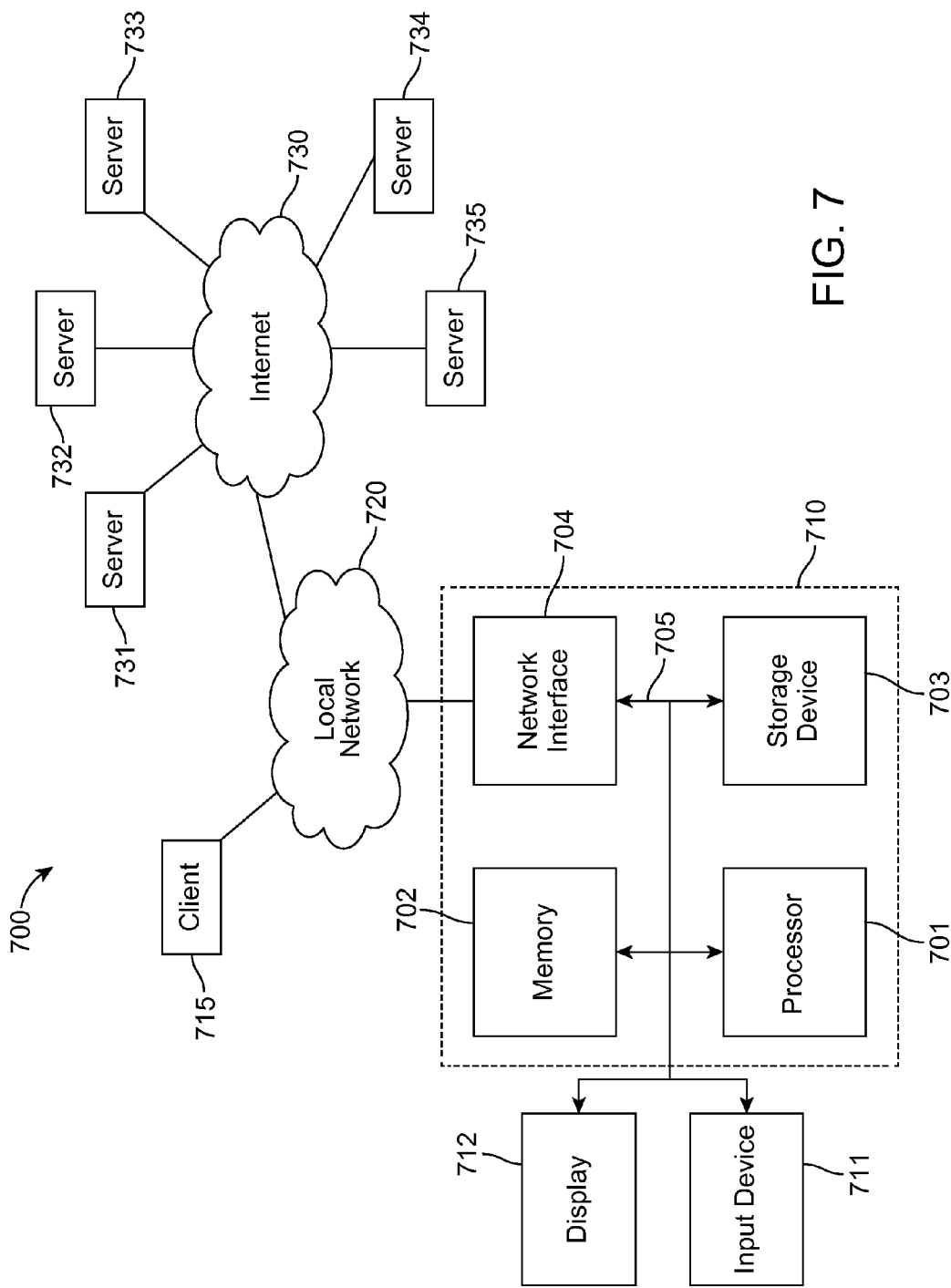
FIG. 7 illustrates an example of a computer system.

An example computer system 710 is illustrated in FIG. 7. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 710 can send and receive information, including messages or other interface actions, through the network interface 704 across a local network 720, an Intranet, or the Internet 730. For a local network, computer system 710 may communicate with a plurality of other computer machines, such as server 715. Accordingly, computer system 710 and server computer systems represented by server 715 may form a cloud computing network, which may be programmed with processes described herein. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   a cost explanation component maintaining a cost model, indexing a query submitted by a user;
   the cost explanation component forwarding the query to a query optimization component maintaining a query graph from a standing query;
   the query optimization component matching the query against the query graph to detect subsumption of operators, and produce a modified query graph;
   forwarding the modified query graph to an operator placement component;
   the operator placement component deploying a new filter operator based upon the modified query graph;
   the cost explanation component receiving information regarding system utilization and operator performance statistics, from an associated distributed Complex Event Processing (CEP) system comprising a host upon which the new filter operator has been deployed;
   based upon the information and the cost model, the cost explanation component providing feedback to the user regarding a monetary cost of the distributed CEP system.

2. A method as in claim 1 further comprising:
   the operator placement component also receiving the information; and
   the operator placement component using the information to perform run-time adaptation.

3. A method as in claim 1, the operator placement component performs a two phase approach for operator placement comprising:
   estimation; and
   run-time monitoring and adaptation.

4. A method as in claim 1, the host comprising an existing host of the distributed CEP system.

5. A method as in claim 1, the host comprising a new host allocated from a resource pool.

6. A method as in claim 1, the operator placement component deploying the new filter operator according to a bin packing technique.

7. A non-transitory computer readable storage medium embodying a computer program for performing a method, said method comprising:
   a cost explanation component maintaining a cost model, indexing a query submitted by a user;
   the cost explanation component forwarding the query to a query optimization component maintaining a query graph from a standing query;
   the query optimization component matching the query against the query graph to detect subsumption of operators, and produce a modified query graph;
   forwarding the modified query graph to an operator placement component;
   the operator placement component deploying a new filter operator based upon the modified query graph;
   the cost explanation component receiving information regarding system utilization and operator performance statistics, from an associated distributed Complex Event Processing (CEP) system comprising a host upon which the new filter operator has been deployed;
   based upon the information and the cost model, the cost explanation component providing feedback to the user regarding a monetary cost of the distributed CEP system.

8. A non-transitory computer readable storage medium as in claim 7, the method further comprising:
   the operator placement component also receiving the information; and
   the operator placement component using the information to perform run-time adaptation.

9. A non-transitory computer readable storage medium as in claim 7, the operator placement component performing a two phase approach for operator placement comprising:
   estimation; and
   run-time monitoring and adaptation.

10. A non-transitory computer readable storage medium as in claim 7, the host comprising an existing host of the distributed CEP system.

11. A non-transitory computer readable storage medium as in claim 7, the host comprising a new host allocated from a resource pool.

12. A non-transitory computer readable storage medium as in claim 7, the operator placement component deploying the new filter operator according to a bin packing technique.

13. A computer system comprising:
    one or more hardware processors;
    a software program, executable on a hardware processor of said computer system, the software program configured with:
    a cost explanation component maintaining a cost model, to index a query submitted by a user;
    the cost explanation component forwarding the query to a query optimization component maintaining a query graph from a standing query;
    the query optimization component matching the query against the query graph to detect subsumption of operators, and produce a modified query graph;
    forward the modified query graph to an operator placement component;

the operator placement component deploying a new filter operator based upon the modified query graph;

the cost explanation component receiving information regarding system utilization and operator performance statistics, from an associated distributed Complex Event Processing (CEP) system comprising a host upon which the new filter operator has been deployed;

based upon the information and the cost model, the cost explanation component providing feedback to the user regarding a monetary cost of the distributed CEP system.

14. A computer system as in claim 13, the software program is further configured with:

the operator placement component also receiving the information; and the operator placement component using the information to perform run-time adaptation.

15. A computer system as in claim 13, the operator placement component performs a two phase approach for operator placement comprising:

estimation; and run-time monitoring and adaptation.

16. A computer system as in claim 13, the host comprising an existing host of the distributed CEP system.

17. A computer system as in claim 13, the host comprising a new host allocated from a resource pool.

18. A computer system as in claim 13, the operator placement component deploying the new filter operator according to a bin packing technique.

* * * * *